(12) United States Patent
Yoshikawa et al.

(10) Patent No.: US 6,193,835 B1
(45) Date of Patent: Feb. 27, 2001

(54) PROCESS FOR PRODUCING RUBBER-BASED COMPOSITE MATERIAL

(75) Inventors: Masato Yoshikawa; Nobuko Kato, both of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/058,151

(22) Filed: Apr. 10, 1998

(30) Foreign Application Priority Data

Apr. 15, 1997 (JP) .................................................. 9-113507

(51) Int. Cl.⁷ ..................................................... B32B 31/00
(52) U.S. Cl. .......................... 156/281; 428/625; 428/629; 428/632; 428/701
(58) Field of Search .............................. 156/281; 428/701, 428/625, 629, 632, 675, 677

(56) References Cited

U.S. PATENT DOCUMENTS

| 4,978,586 | * | 12/1990 | Chambare et al. .................. | 428/625 |
| 5,403,419 | | 4/1995 | Yoshikawa et al. . | |
| 5,578,669 | * | 11/1996 | Odawa et al. ....................... | 524/414 |

FOREIGN PATENT DOCUMENTS

| 62-87311 | 4/1987 | (JP) . |
| 62-246278 | 10/1987 | (JP) . |
| 1-290342 | 11/1989 | (JP) . |
| 8-296032 | 11/1996 | (JP) . |

OTHER PUBLICATIONS

JP 03 220242 A, Patent Abstracts of Japan, Sep. 27, 1991, Derwent Publications Ltd., Week 9145.
JP 08 295742 A, Patent Abstracts of Japan, Nov. 12, 1996, Derwent Publications Ltd., Week 9704.
JP 03 220241 A, Patent Abstracts of Japan, Sep. 27, 1991, Derwent Publications Ltd., Week 9145.
JP 54 146880 A, Patent Abstracts of Japan, Nov. 16, 1979, Derwent Publications Ltd., Week 8001.

* cited by examiner

*Primary Examiner*—Mark A. Osele
(74) *Attorney, Agent, or Firm*—Sughrue, Mion, Zinn, Macpeak & Seas, PLLC

(57) ABSTRACT

A process for producing a rubber-based composite material including steps of laminating a rubber compound onto a substrate, with a bonding layer of metal or metal compound interposed therebetween, and subsequently vulcanizing the rubber compound, characterized in that a prime-coating film is interposed between the substrate and the bonding film of metal or metal compound. The rubber-based composite material retains good bond strength even when used in such a way that its bond interface is in contact with water. In addition, it has good adhesion to the substrate treated by conversion treatment.

5 Claims, No Drawings

PROCESS FOR PRODUCING RUBBER-BASED COMPOSITE MATERIAL

BACKGROUND OF THE INVENTION

The present invention relates to a process for producing a rubber-based composite material which has good adhesion between a rubber layer and a substrate.

Rubber-metal composite materials have been widely used as, for example, rubber vibration insulators. They need firm rubber-to-metal bonding.

In view of the foregoing, the present applicant proposed in Japanese Patent Laid-open Nos. 87311/1987 and 246278/1987 a process for producing a rubber composite material which is characterized by coating the substrate with a thin film of cobalt or cobalt alloy by "dry plating", thereby achieving firm bonding between rubber and substrate at the time of vulcanization. In addition, the present applicant disclosed in Japanese Patent Laid-open No. 290342/1989 that the rubber composite material is improved in durability (resistance to wet heat deterioration) if the cobalt is oxidized when the cobalt film is formed or after the cobalt film has been formed.

Moreover, the present applicant proposed in Japanese Patent Laid-open No. 296032/1996 corresponding to the U.S. patent application Ser. No. 08/634,792 a method for preparing a rubber composite material comprising the steps of forming a thin film of cobalt oxide on a substrate, forming a rubber composition on the thin film, and vulcanizing the rubber composition, said step of forming a thin film of cobalt oxide comprising sputtering a target of cobalt in the presence of an inert gas and a gas having molecular oxygen with an input power which is at least the transition point at which an input voltage between the target and the substrate abruptly rises when an input power is supplied to the target from a DC supply.

This process yields a rubber-based composite material which exhibits good adhesion under the wet heat condition owing to the cobalt oxide (CoOx) film formed in the oxygen gas stream.

In the meantime, a rubber-based composite material (such as rubber vibration insulator) often has its bonding interface exposed, and there is a possibility of the bonding interface coming into direct contact with water. In anticipation of such incidences, the composite material undergoes test for adhesive failure under a wet condition.

The rubber-based composite material having a cobalt oxide film on a metal substrate experiences peeling in the test for adhesive failure as soon as the bonding interface is given water, although it exhibits good adhesion (with rupture occurring always only in rubber) in the ordinary test for adhesive failure. There has been a demand for solution to this problem.

SUMMARY OF THE INVENTION

Therefore, it is an object of the present invention to provide a process for producing a rubber-based composite material which exhibits good adhesion even in the case where the bonding interface comes into contact with water.

In order to achieve the above-mentioned object, the present inventors carried out a series of research efforts, which led to the following finding. That is, a rubber-based composite material which is formed by laminating a layer of rubber compound onto a substrate, with a bonding layer of metal or metal compound interposed between them and subsequently vulcanizing the rubber compound, exhibits firm bonding between the rubber layer and the substrate if a prime coating film is interposed between the substrate and the bonding layer. The firm bonding is such that failure occurs solely in rubber in the wet bond test. When used as a rubber vibration insulator, the rubber-based composite material exhibits good adhesion even when the bonding interface comes into contact with water. The prime coating film produces its profound effect when it is formed on a metal surface with phosphating treatment or any other conversion treatment. The present invention is based on this finding.

Accordingly, the present invention provides a process for producing a rubber-based composite material comprising steps of laminating a rubber compound onto a substrate, with a bonding layer of metal or metal compound interposed therebetween, and subsequently vulcanizing the rubber compound, characterized in that a prime-coating film is interposed between the substrate and the bonding film of metal or metal compound.

DESCRIPTION OF THE PREFERRED EMBODIMENTS

The rubber-based composite material of the present invention is not specifically restricted in its substrate, which may be made of metal, ceramics, or plastics. Metal includes, for example, steel, stainless steel, titanium alloy, aluminum, aluminum alloy, copper, copper alloy, zinc, zinc alloy, and amorphous alloy. The choices of these materials such as metal, ceramics and plastics and the size and shape of the substrate depend on the intended use of the composite material.

The process of the present invention should preferably be applied to a steel substrate with zinc phosphating treatment or any other chemical conversion treatment.

The rubber compound to be laminated onto the substrate according to the present invention should be based on one or more than one kind of natural rubber (NR) or synthetic rubber having carbon-carbon double bonds in the structural formula.

Examples of the synthetic rubber include the following.
(1) Homopolymers of conjugated diene compound such as isoprene, butadiene, and chloroprene. Examples include polyisoprene rubber (IR), polybutadiene rubber (BR), and polychloroprene rubber.
(2) Copolymers of said conjugated diene compound with a vinyl compound such as styrene, acrylonitrile, vinylpyridine, acrylic acid, methacrylic acid, alkyl acrylate, and alkyl methacrylate. Examples include styrene-butadiene copolymer rubber (SBR), vinylpyridine butadiene styrene copolymer rubber, acrylonitrile butadiene copolymer rubber, acrylic acid butadiene copolymer rubber, methacrylic acid butadiene copolymer rubber, methyl acrylate butadiene copolymer rubber, and methyl methacrylate butadiene copolymer rubber.
(3) Copolymers of olefin (such as ethylene, propylene, and isobutylene) with diene compound. Examples include isobutylene-isoprene copolymer rubber (IIR).
(4) Copolymers (EPDM) of olefin with non-conjugated diene. Examples include ethylene-propylene-cyclopentadiene terpolymer, ethylene-propylene-5-ethylidene-2-norbornene terpolymer, and ethylene-propylene-1,4-hexadiene terpolymer.
(5) Polyalkenamer obtained by ring opening polymerization of cycloolefin. Examples include polypentenamer.
(6) Rubber obtained by ring opening polymerization of oxirane. Examples include polyepichlorohydrin rubber vulcanizable with sulfur.

(7) Polypropylene oxide rubber.

Additional examples include their halides, such as chlorinated isobutylene-isoprene copolymer rubber (Cl-IIR) and brominated isobutylene-isoprene copolymer rubber (Br-IIR). Other examples include polymers obtained by ring opening polymerization of norbornane. The above-mentioned rubber may be blended with a saturated elastomer such as epichlorohydrin rubber, polypropylene oxide rubber, and chlorosulfonated polyethylene.

The rubber compound used in the present invention should be incorporated with a vulcanizing agent such as sulfur, organic sulfur compound and the other crosslinking agents in an amount of 0.01–10 parts by weight, preferably 0.1–6 parts by weight, and a vulcanization accelerator in an amount of 0.01–10 parts by weight, preferably 0.1–5 parts by weight, for 100 parts by weight of the above-mentioned rubber component. A preferred example of the vulcanization accelerator is N-cyclohexyl-2-benzothiazylsulphenamide (CZ). It reduces the vulcanizing time.

The rubber compound used in the present invention should preferably be incorporated with process oil, mineral oil, or vegetable oil. Process oil includes paraffinic process oil, naphthenic process oil, and aromatic process oil. Mineral oil includes ethylene-α-olefin cooligomer, paraffin wax, and liquid paraffin. Vegetable oil includes castor oil, cottonseed oil, linseed oil, rapeseed oil, soybean oil, palm oil, coconut oil, and peanut oil. These oils improve the bonding under wet heat conditions of the rubber to the cobalt oxide thin film in the case where the rubber compound is incorporated with CZ. The amount of the oil should be 3–50 parts by weight, preferably 4–10 parts by weight, for 100 parts by weight of the rubber component. With an amount less than specified above, the oil does not produce the effect of improving the bonding under wet heat conditions. With an amount more than specified above, the oil greatly changes the spring properties of the rubber. In the case of rubber vibration insulator, an excess amount of oil greatly changes tan δ which is an important factor to dampen vibrations.

The rubber compound used in the present invention may be incorporated in the usual way with fillers (such as carbon black, silica, calcium carbonate, calcium sulfate, clay, and mica) and accelerator activator (such as zinc oxide and stearic acid) according to its intended use. Incidentally, the process of the present invention does not necessarily require an organic cobalt salt to promote adhesion between rubber and partly oxidized cobalt.

Bonding between the rubber compound and the substrate is accomplished by heating under pressure. Vulcanization may be carried out in the usual way by the aid of sulfur or an organic sulfur compound such as dithiomorpholine and thiuram. The amount of sulfur or sulfur in the organic sulfur compound should be 0.5–7 parts by weight, preferably 1–6 parts by weight, for 100 parts by weight of the rubber component. The condition of vulcanization is not specifically restricted although heating at 155° C. for 20 minutes is preferred.

The process of the present invention is characterized in that the rubber compound incorporated with a large amount (e.g., 5–6 parts by weight) of sulfur provides firm bonding between rubber and substrate even though it undergoes vulcanization for a long time. Therefore, the process of the present invention can be widely applied to the production of rubber-based composite materials such as tires, power transmission belts, conveyor belts, and hoses which have metal fibers as the core and other various rubber products and parts such as rubber vibration insulator, antiseismic rubber, rubber crawler, rubber screen, and rubber roll.

According to the process of the present invention, bonding between the rubber layer and the substrate is accomplished, with a bonding layer of metal thin film or metal compound thin film interposed between them. This bonding layer is formed on a prime-coating film formed on the substrate. This structure provides good adhesion even when the composite material is used under such a condition that the bonding boundary is in contact with water.

The bonding layer may be formed from such metals as zinc, copper, and cobalt, or alloys or compounds thereof. Preferred examples include cobalt, cobalt alloys with Zn, Cu, Cr, Ti, or Ni, with the content of cobalt being higher than 50% by weight, particularly higher than 70% by weight, and cobalt oxide, nitride, and carbide. Cobalt oxide, nitride, and carbide may be represented by $CoO_x$, $CoN_y$, and $CoC_z$, respectively, with x being 0–1.8, preferably 0–1.6, y being 0–1.6, preferably 0–1.4, and z being 0–3.2, preferably 0–2.8.

The thickness of the bonding layer is not specifically restricted. It is usually 10 Å to 100 μm, preferably 50 Å to 1 μm.

The prime coating film may be formed from an organic coating material or metal or metal compound. Examples of metal include aluminum, chromium, titanium, zinc, silicon, nickel, copper, silver, tantalum, and tungsten. Examples of metal compound include oxide, nitride, and carbide of these metals, and also include cobalt oxide, nitride, and carbide. The prime coating layer should be different from the bonding layer.

In the case where the prime coating film is cobalt oxide ($CoO_a$), cobalt nitride ($CoN_b$), or cobalt carbide ($CoC_c$), the values of a, b, and c should be smaller than 10, particularly smaller than 5, such that a>x, b>y, and c>z, although it is permissible that a=x, b=y, and c=z.

A pronounced effect is obtained in the case where the bonding layer is made of cobalt or cobalt oxide and the prime-coating film is made of aluminum or cobalt oxide which is more oxidized than that used for the bonding layer.

The prime coating film is not necessarily limited to one layer, and it is permissible to form more than one layer.

The prime coating film is not specifically restricted in thickness; it may be thicker than 10 Å, particularly thicker than 50 Å, and thinner than 10 μm, preferably thinner than 2 μm.

The bonding layer and the prime coating film may be formed in any manner. For example, the bonding layer may be formed by vapor plating, such as vacuum deposition, ion plating, DC magnetron sputtering, diode sputtering, rf sputtering, plasma polymerization, and plasma CVD. The bonding layer of cobalt oxide, nitride, or carbide may be formed by using a cobalt target and applying DC power to the target in an inert gas (such as He, Ar, etc.) containing $O_2$ (or oxygen compound), $N_2$ (or nitrogen compound), or $CH_4$ (or carbon compound), respectively. The details of this process will be found in Japanese Patent Laid-open No. 296032/1996 or the U.S. patent application Ser. No. 08/634,792.

The prime coating film may be formed from metal or metal compound by vapor plating in the same manner as used for the bonding layer.

In the case where the bonding layer is formed from cobalt or cobalt oxide, nitride, or carbide, and the prime coating film is formed from cobalt oxide, nitride, or carbide by sputtering with a cobalt target in an inert gas, it is possible to form the two layers continuously by changing the content of $O_2$, $N_2$, or $CH_4$ in the inert gas. To be more specific, if the prime coating film of cobalt oxide and the bonding layer of cobalt or cobalt oxide which is less oxidized than that for the prime coating film are to be formed, sputtering should be performed in the following manner. In the initial stage, the inert gas contains a larger amount of oxygen, ozone, air, or water (or any other oxygen compound), so as to form a film of cobalt oxide (CoOx where x=1.8–10, preferably 1.8–5). After the lapse of a certain period of time or after the prime coating film of desired thickness has been formed, the supply of the oxygen compound gas is reduced or suspended, so as to form a film of cobalt oxide (Coox where x=0–1.8, preferably 0–1.6). By gradually reducing the supply of the oxygen compound gas instead of abruptly suspending described above, it is possible to form cobalt oxide such that it gradually decreases in the degree of oxidation across the interface between the prime coating film and the bonding layer. Another possible way is to gradually decrease the supply of the oxygen compound gas as sputtering proceeds, so that the resulting cobalt oxide gradually decreases in the degree of oxidation in going through the thickness of the film.

EXAMPLES

The invention will be described in more detail with reference to the following examples, which are not intended to restrict the scope thereof.

Example 1

A piece of aluminum sheet measuring 10×75×0.5 mm was used as a substrate. The surface of the substrate was washed with acetone and subjected to low-pressure argon plasma treatment at 13.56 MHZ and 100 W, for 5 minutes. On the substrate was formed an aluminum film 1000 Å (target value) in thickness by sputtering under the following conditions.

Target: aluminum

Flow rate of argon gas: 18 ml/min

Gas partial pressure: 10 mTorr

Power applied to the target: 500 W

Duration of sputtering: 5 minutes

On the aluminum film was formed the bonding layer 500 Å (target value) in thickness by sputtering under the following conditions.

Target: cobalt

Flow rate of argon gas: 18 ml/min

Supply of oxygen: as shown in Table 2

Power applied to the target: 800 W

Duration of sputtering: 1 minute

On the substrate was stuck an unvulcanized rubber compound shown in Table 1, which was subsequently vulcanized at 145° C. for 40 minutes to achieve bonding. The assembly was tested for bond strength in the following manner. The results are shown in Table 2.

For comparison, the same procedure as mentioned above was repeated except that the aluminum film was not formed. The results are shown in Table 2.

TABLE 1

| Ingredient | Parts by weight |
|---|---|
| Natural rubber | 75 |
| Synthetic polyisoprene | 25 |
| Carbon black | 60 |
| Zinc oxide | 7.5 |
| Antioxidant*1 | 2 |
| Vulcanization accelerator*2 | 1 |
| Sulfur | 5 |
| Mineral Oil | 2 |

*1 N-phenyl-N'-isopropyl-p-phenylenediamine
*2 N-oxydiethylene-2-benzothiazolsulfide Method for testing bond strength The T-peel test was applied to the sample having the substrate of aluminum sheet. The 90° peel test was applied to the sample having the substrate of cold rolled carbon steel sheet (SPCC) or the substrate with chemical conversion (described later). The bond test is referred to as "dry test" or "wet test" whether or not the sample is given pure water dropwise during the test. In both tests, the bond strength is rated as best if failure occurs entirely in the rubber layer.

TABLE 2

| | Formation of cobalt film | | | Bond strength | |
|---|---|---|---|---|---|
| | Prime coating film (aluminum film) | Oxygen flow rate (ml/min) | Power applied (W) | Dry test | Wet test |
| Comparative Examples | No | 0 | 850 | R-100 | I-100 |
| | No | 1 | 864 | R-100 | I-100 |
| | No | 5 | 923 | R-100 | I-100 |
| | No | 15 | 1022 | R-100 | I-100 |
| Examples | Yes | 0 | 850 | R-100 | R-100 |
| | Yes | 1 | 864 | R-100 | R-100 |
| | Yes | 5 | 923 | R-100 | R-100 |
| | Yes | 15 | 1022 | R-100 | R-100 |

R: Failure in the rubber layer
I: Failure at the interface

Example 2

The same procedure as in Example 1 was repeated to form the rubber-based composite materials except that the substrate was replaced by a piece of steel sheet measuring 60×25×2.3 mm coated with zinc phosphate. The samples were tested for bond strength. The results are shown in Table 3.

TABLE 3

| | Formation of cobalt film | | | Bond strength | |
|---|---|---|---|---|---|
| | Prime coating film (aluminum film) | Oxygen flow rate (ml/min) | Power applied (W) | Dry test | Wet test |
| Comparative Examples | No | 0 | 850 | R-50 | I-100 |
| | No | 1 | 864 | R-55 | I-100 |
| | No | 5 | 923 | R-60 | I-100 |
| | No | 15 | 1022 | R-55 | I-100 |
| | No | 22 | 974 | R-55 | I-100 |
| | No | 25 | 1050 | R-60 | I-100 |

TABLE 3-continued

|  | Prime coating film (aluminum film) | Formation of cobalt film | | Bond strength | |
|---|---|---|---|---|---|
|  |  | Oxygen flow rate (ml/min) | Power applied (W) | Dry test | Wet test |
| Examples | Yes | 0 | 850 | R-100 | R-100 |
|  | Yes | 1 | 864 | R-100 | R-100 |
|  | Yes | 5 | 923 | R-100 | R-100 |
|  | Yes | 15 | 1022 | R-100 | R-100 |
|  | Yes | 22 | 974 | R-100 | R-100 |
|  | Yes | 25 | 1050 | R-100 | R-100 |

R: Failure in the rubber layer
I: Failure at the interface

Example 3

A substrate of cold called steel sheet (SPCC), measuring 60×25×2.3 mm, was subjected to low-pressure argon plasma treatment in the same manner as in Example 1.

On the substrate was formed a cobalt oxide film by sputtering under the following condition.

Target: cobalt
Flow rate of argon gas: 20 ml/min
Flow rate of oxygen: as shown in Table 4
Power applied to the target: 800 W
Gas pressure: 5 mTorr Thus, there were continuously formed the prime coating film and bonding layer whose total thickness was 1000 Å (target value).

Using this substrate, a rubber-based composite material was prepared in the same way as in Example 1. The samples were tested for bond strength. The results are shown in Table 4.

TABLE 4

|  | Formation of cobalt oxide film Oxygen flow rate, duration, power | Bond strength | |
|---|---|---|---|
|  |  | Dry test | Wet test |
| Examples | 20 ml/min, 10 minutes, 800 W | R-100 | R-100 |
|  | + |  |  |
|  | 5 ml/min, 1 minute, 800 W |  |  |
|  | 20 ml/min, 5 minutes, 800 W | R-100 | R-100 |
|  | + |  |  |
| 20 → | 5 ml/min, 5 minutes, 800 W |  |  |
|  | + |  |  |
|  | 5 ml/min, 1 minute, 800 W | R-100 | R-0 |

TABLE 4-continued

|  | Formation of cobalt oxide film Oxygen flow rate, duration, power | Bond strength | |
|---|---|---|---|
|  |  | Dry test | Wet test |
| Comparative Example | 5 ml/min, 1 minute, 800 W |  |  |

As demonstrated above, the present invention provides a rubber-based composite material which retains good bond strength even when used in such a way that its bond interface is in contact with water. In addition, the present invention achieves good adhesion to the substrate treated by chemical conversion.

What is claimed is:

1. A process for producing a rubber-based composite material comprising steps of: laminating a rubber compound onto a substrate, with a bonding layer of metal or metal compound interposed therebetween, and subsequently vulcanizing the rubber compound, characterized in that a prime-coating film is formed directly on the substrate, the bonding layer of metal or metal compound is formed directly on said prime-coating film, and said rubber compound is formed directly on said bonding layer, said bonding layer being made of cobalt or cobalt oxide, and the prime coating film being made of one member selected from aluminum, chromium, titanium, silicon, and nickel, and their oxides, nitrides and carbides.

2. A process as defined in claim 1, wherein the substrate has a surface treated by phosphating treatment.

3. A process as defined in claim 1, wherein the prime coating film being made of one member selected from aluminum and its oxide, nitride and carbide.

4. A process for producing a rubber-based composite material comprising steps of: laminating a rubber compound onto a substrate, with a bonding layer of metal or metal compound interposed therebetween, and subsequently vulcanizing the rubber compound, characterized in that a prime-coating film is interposed between the substrate and the bonding film of metal or metal compound, said bonding layer being made of cobalt or cobalt oxide and the prime coating film being made of cobalt oxide which is more oxidized than that used for bonding layer.

5. A process as defined in claim 4, wherein the prime coating film and the bonding layer form a continuous layer such that the degree of oxidation of cobalt oxide gradually decreases in going across to the interface between the prime coating film and the bonding layer.

* * * * *